(12) United States Patent
Galinski et al.

(10) Patent No.: US 12,723,609 B2
(45) Date of Patent: Sep. 1, 2026

(54) INTEGRATED FASTENER SYSTEM

(71) Applicant: Illinois Tool Works Inc., Glenview, IL (US)

(72) Inventors: Adolph G. Galinski, Burr Ridge, IL (US); Kileean E. Bell, Monee, IL (US); Timothy D. Pearson, New Lenox, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/773,095

(22) Filed: Jul. 15, 2024

(65) Prior Publication Data

US 2024/0369086 A1 Nov. 7, 2024

Related U.S. Application Data

(63) Continuation of application No. 17/853,066, filed on Jun. 29, 2022, now Pat. No. 12,071,976.

(60) Provisional application No. 63/239,620, filed on Sep. 1, 2021.

(51) Int. Cl.

*F16B 5/06* (2006.01)
*F16B 21/08* (2006.01)
*B33Y 80/00* (2015.01)

(52) U.S. Cl.

CPC ............ *F16B 5/0664* (2013.01); *F16B 5/065* (2013.01); *F16B 21/086* (2013.01); *B33Y 80/00* (2014.12)

(58) Field of Classification Search

CPC ...... F16B 5/0664; F16B 5/065; F16B 21/086; F16B 5/126; F16B 21/084; F16B 33/004; B33Y 80/00; B33Y 10/00; B29C 64/118

See application file for complete search history.

(56) References Cited

U.S. PATENT DOCUMENTS 6,305,055 B1 10/2001 Castro
6,916,145 B2 * 7/2005 Lydan .................. F16B 5/0642 411/510
6,974,292 B2 12/2005 Hansen
8,402,605 B2 3/2013 Courtin
8,613,128 B2 12/2013 Moerke
9,475,525 B2 10/2016 Lepper
9,963,087 B2 5/2018 Leverger
9,982,694 B2 5/2018 Scroggie
10,018,214 B2 7/2018 Yon
11,078,944 B2 8/2021 Lepper (Continued)

FOREIGN PATENT DOCUMENTS

WO 2017040728 A1 3/2017

*Primary Examiner* — David M Upchurch

(74) *Attorney, Agent, or Firm* — McAndrews, Held & Malloy, Ltd.

(57) ABSTRACT

Disclosed are systems and methods for coupling a first component to a second component via an integrated fastener. The component assembly includes a first component having a first surface and a second surface. An integrated fastener extending from the second surface and configured to attach the first component adjacent to the second component. The first component and the integrated fastener are formed as a unitary structure using, for example, an additive manufacturing process. The integrated fastener can include a clip assembly with one or more retention features extending outwardly from the integrated fastener at an end opposite the first component.

20 Claims, 14 Drawing Sheets

(56) References Cited

U.S. PATENT DOCUMENTS

Figures 1A, 1B:
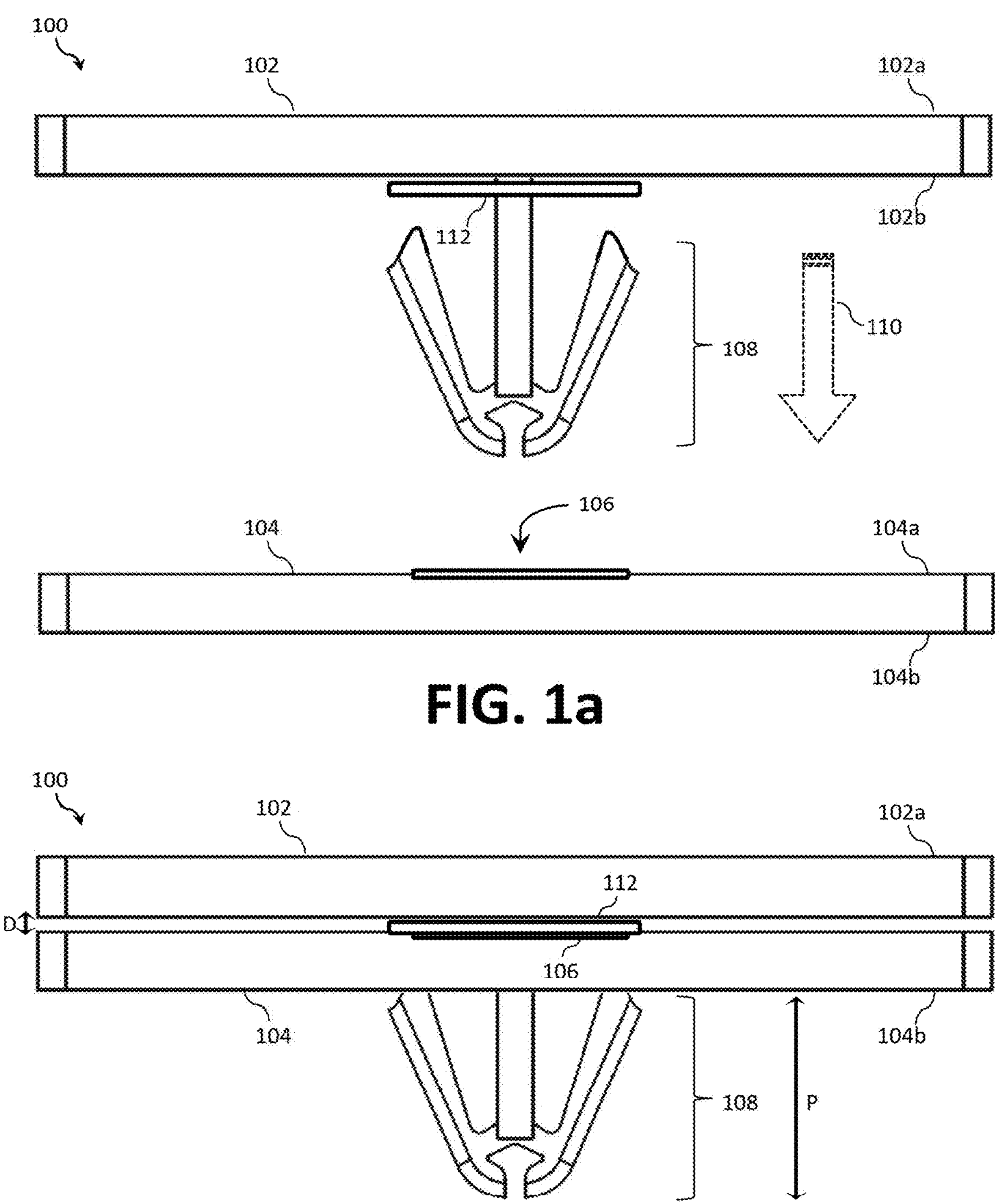

| | | | | |
|---|---|---|---|---|
| 11,155,031 | B2 | 10/2021 | Chapiro | |
| 2012/0257924 | A1* | 10/2012 | Andrews | F16B 21/086 403/381 |
| 2017/0335877 | A1 | 11/2017 | Steltz | |
| 2019/0039661 | A1* | 2/2019 | Lee | B62D 27/06 |
| 2020/0361400 | A1* | 11/2020 | Loyola | B60R 13/02 |

* cited by examiner

A
108
108
108
108
108
108
A
102
102

102
108
108
Detail A 108
204
202
208
210
206a
206b
102
206
Detail A
(A-A)

104
106
106
Detail C 302
106
302
302
Detail B

106
Detail C
(B-B)

210
102
202
402
206
204a
α
404
406
204b
204c
204d
206a
204e
204f 500
502
204g 500
502
D-D
204g
206b
506a 500
502
C-C
206b
504
210
504

500
D-D
120°
202
504
504
504
210
506b
120°
120°

210
502
E-E
Detail D
Detail D
204h
$D_1$
404a
404b
602

210
502
202
Detail E
Detail E
204h
$D_1$
404a
404b
602

F-F
206
206a
206b

G-G
202a
206a
206b
202
202b 210
202a
206
206a
206b
202
202b
204i 210
202a
206
206a
206b
202b
204i

INTEGRATED FASTENER SYSTEM

RELATED APPLICATIONS

The present application claims priority to and is a continuation of U.S. patent application Ser. No. 17/853,066, filed Jun. 29, 2022, which claims priority to U.S. Provisional Patent Application No. 63/239,620, filed Sep. 1, 2021, and entitled "Integrated Fastener System," which are hereby incorporated by reference in its entirety.

BACKGROUND

Automotive components require fastening techniques that are simple to manufacture and assemble. Further, fastening techniques should above all be reliable and efficient. A blind, close-panel assembly is a condition where the fastening is focused between the panels being fastened to each other (such as automotive panels or other components), while trying to keep those same panels positioned very closely to each other.

Typical fastening solutions that allow this type of closely-positioned assembly include, magnets, adhesive tape, and mechanical fasteners. For example, a fastener (whether metal or plastic) can be used to make a blind connection between panels. Traditionally, a fastener can be received within an opening (e.g., a window or aperture) formed in a primary panel and configured to irremovably engage a clip-attachment structure (e.g., a doghouse, blade that extends from an undersurface of a secondary panel, etc.).

It would be highly desirable to have a fastener assembly with improved assembly characteristics that provides reliable and secure fastening, while allowing for the panels to be positioned very closely to each other. In addition, existing fasteners are traditionally provided as components that are separate from both the primary panel and the secondary panel, which are later combined during assembly. In some applications, however, it would be desirable to have a fastener assembly with an integrated fastener to reduce assembly steps.

SUMMARY

The present disclosure relates generally to a fastening system to form a connection between the components, such as automotive panels, using a fastener with improved assembly characteristics that may be integrated with a component, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures, where like or similar reference numbers refer to like or similar structures. The figures are not necessarily to scale, emphasis instead being placed upon illustrating the principles of the devices, systems, and methods described herein.

FIGS. 1*a* and 1*b* illustrate, respectively, assembly and assembled side views of example fastening systems configured to form a blind connection between components in accordance with aspects of this disclosure.

Figures 2A, 2B:
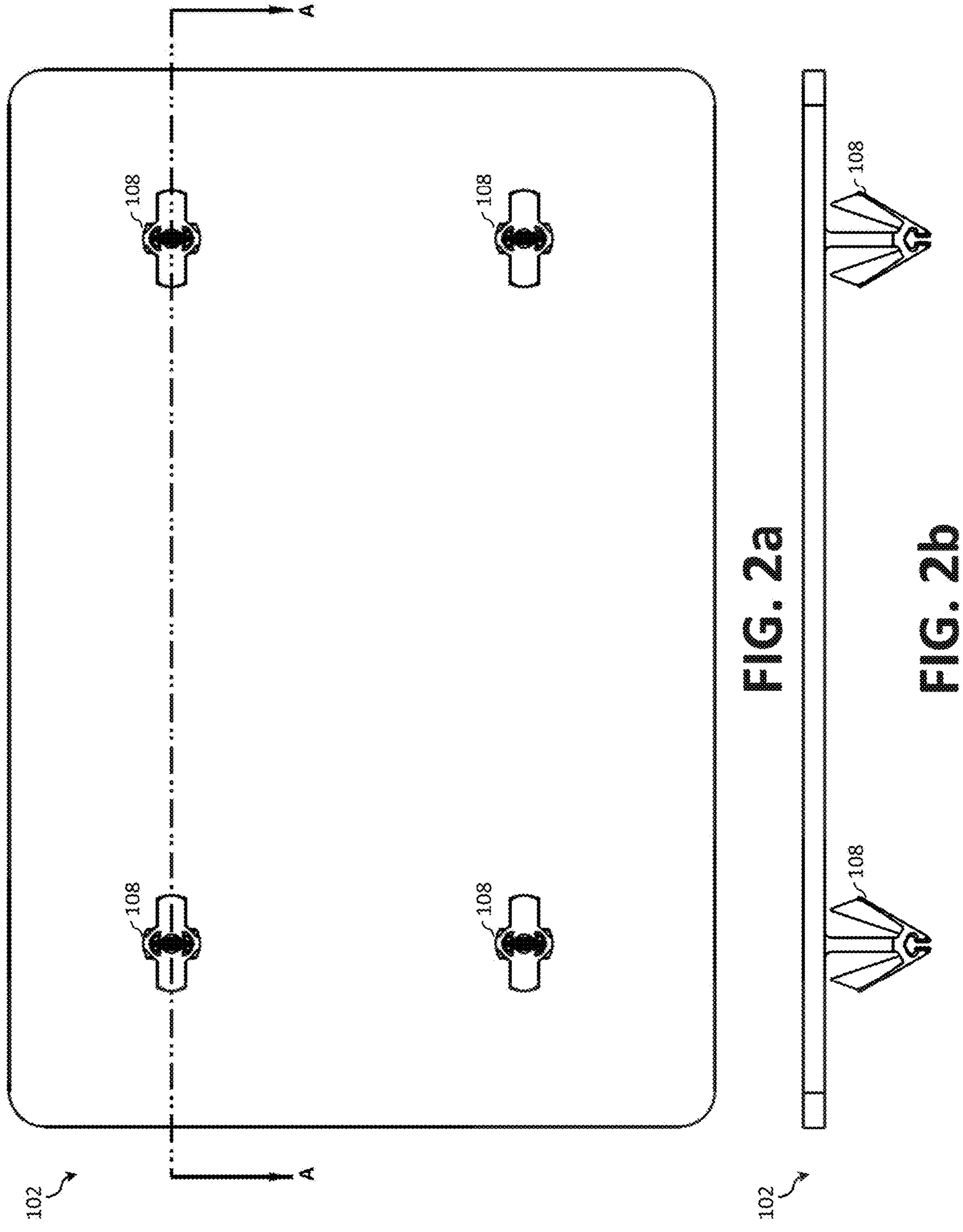

FIGS. 2*a* and 2*b* illustrate, respectively, bottom plan and side views of an example first component of FIGS. 1*a* and 1*b*.

Figures 2C, 2D:
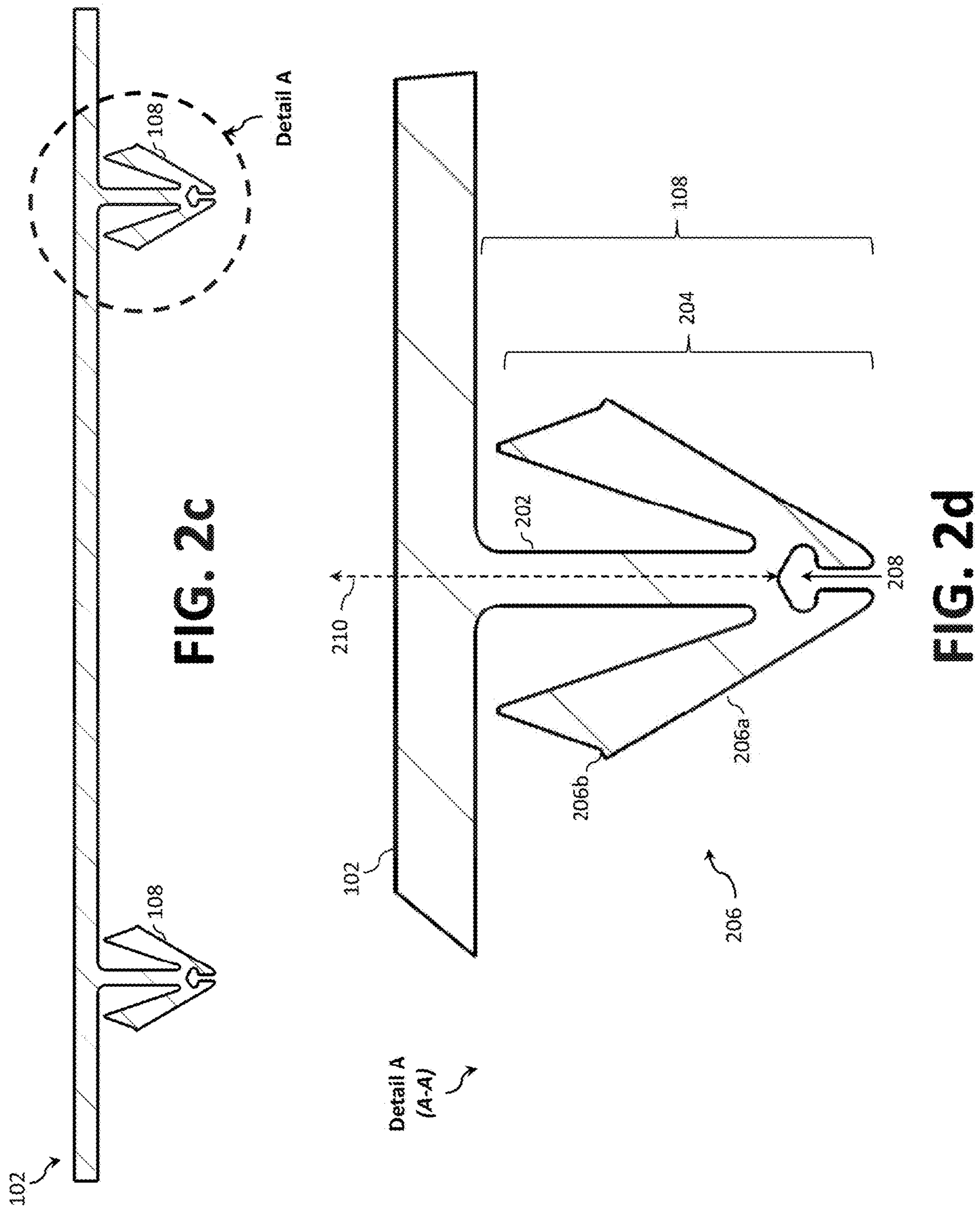

FIG. 2*c* illustrates a cross-sectional view taken along line A-A of FIG. 2*a*.

FIG. 2*d* illustrates a detailed view of FIG. 2*a*.

Figures 3A, 3B:
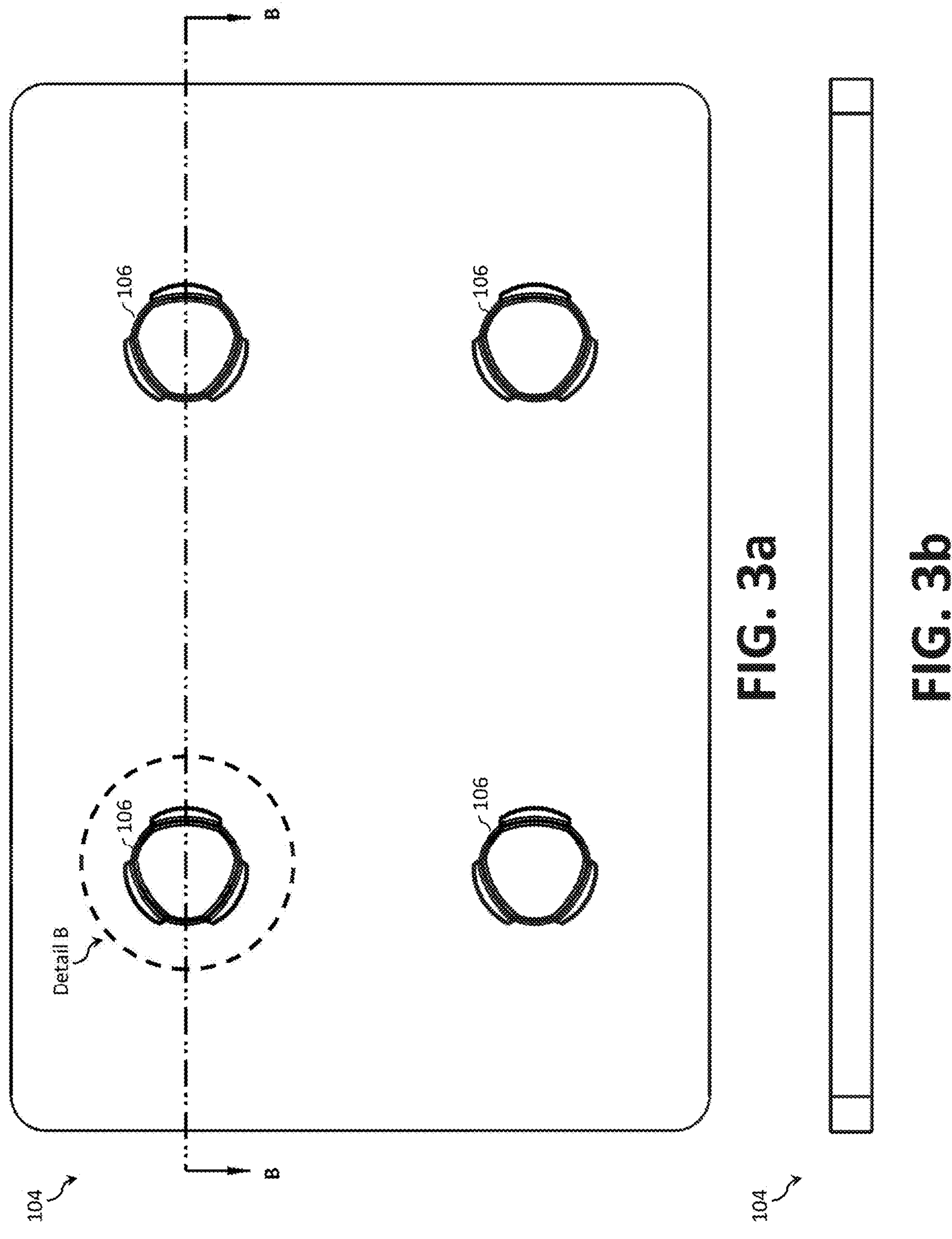

FIGS. 3*a* and 3*b* illustrate, respectively, top plan and side views of the example second component of FIGS. 1*a* and 1*b*.

Figures 3C, 3D, 3E:
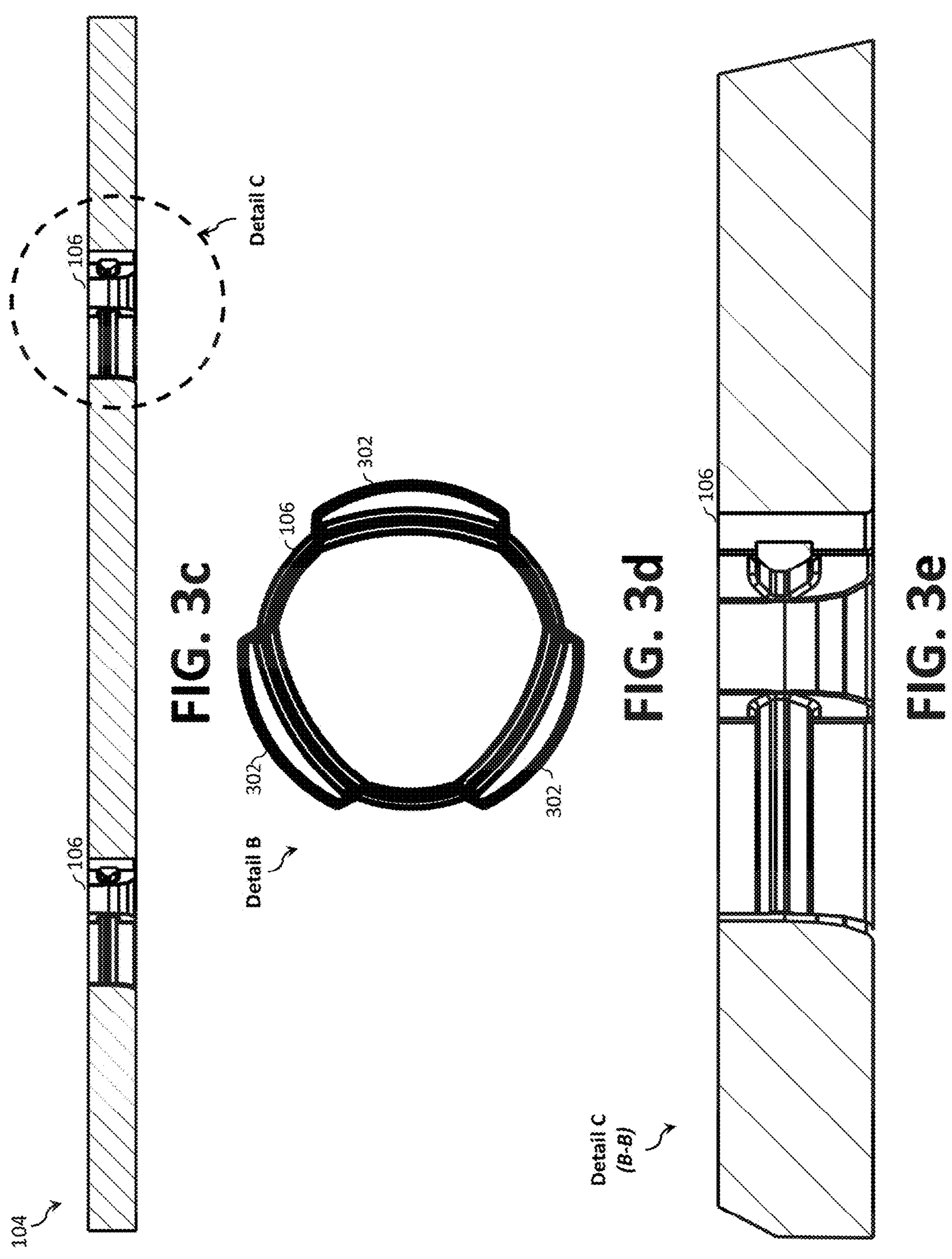

FIG. 3*c* illustrates a cross-sectional view taken along line B-B of FIG. 3*a*.

FIGS. 3*d* and 3*e* illustrate detailed views of FIG. 3*a*.

FIGS. 4*a* through 4*f* illustrate, respectively, a push pin fastener, a pin and grommet (P&G) fastener, a box-prong fastener, a specialty fastener, an integrated clip assembly with four retaining legs, and an integrated clip assembly with two snap-engaging seats.

Figures 5A, 5B, 5C, 5D:
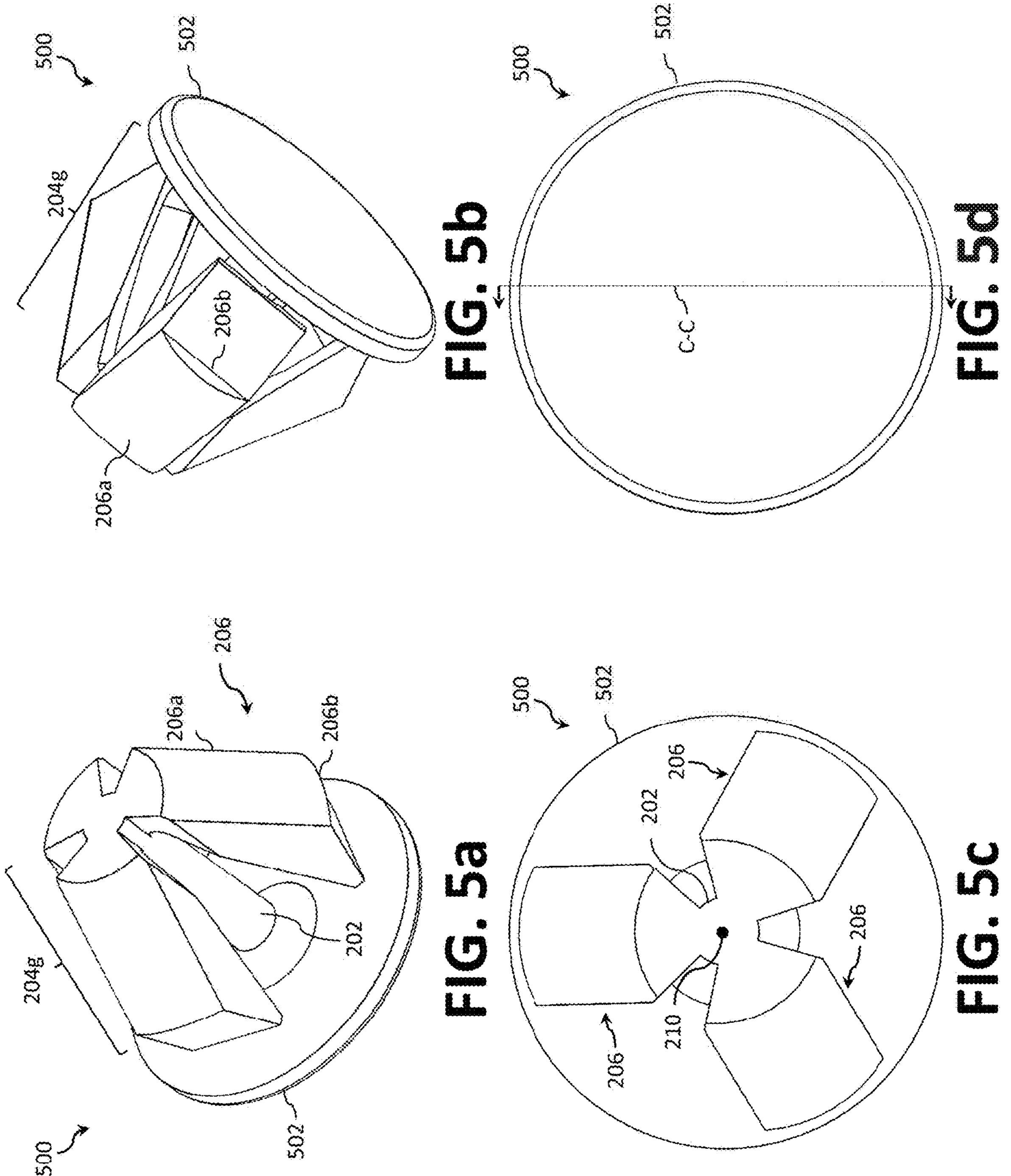

FIG. 5*a* illustrates a bottom isometric view of a 3-legged clip fastener in accordance with aspects of this disclosure.

FIG. 5*b* illustrates a top isometric view of the 3-legged clip fastener of FIG. 5*a*.

FIGS. 5*c* through 5*f* illustrate, respectively, bottom plan, top plan, first side, and second side views of the 3-legged clip fastener.

Figures 5E, 5F, 5G, 5H:
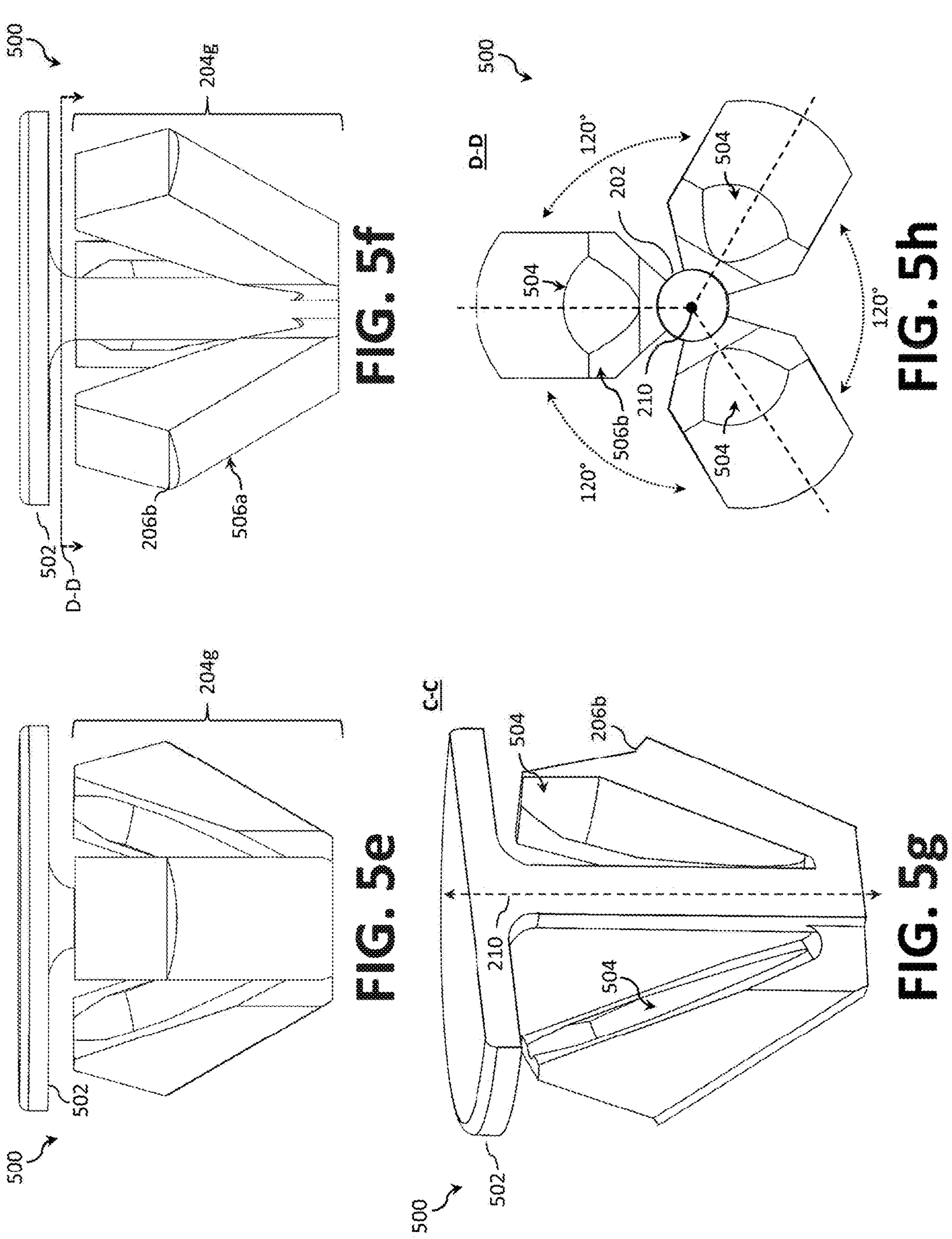

FIG. 5*g* illustrates a cross-sectional view of the 3-legged clip fastener taken along cutline C-C of FIG. 5*d*.

FIG. 5*h* illustrates a cross-sectional view of the 3-legged clip fastener taken along cutline D-D of FIG. 5*f*.

Figures 6A, 6B, 6C, 6D, 6E:
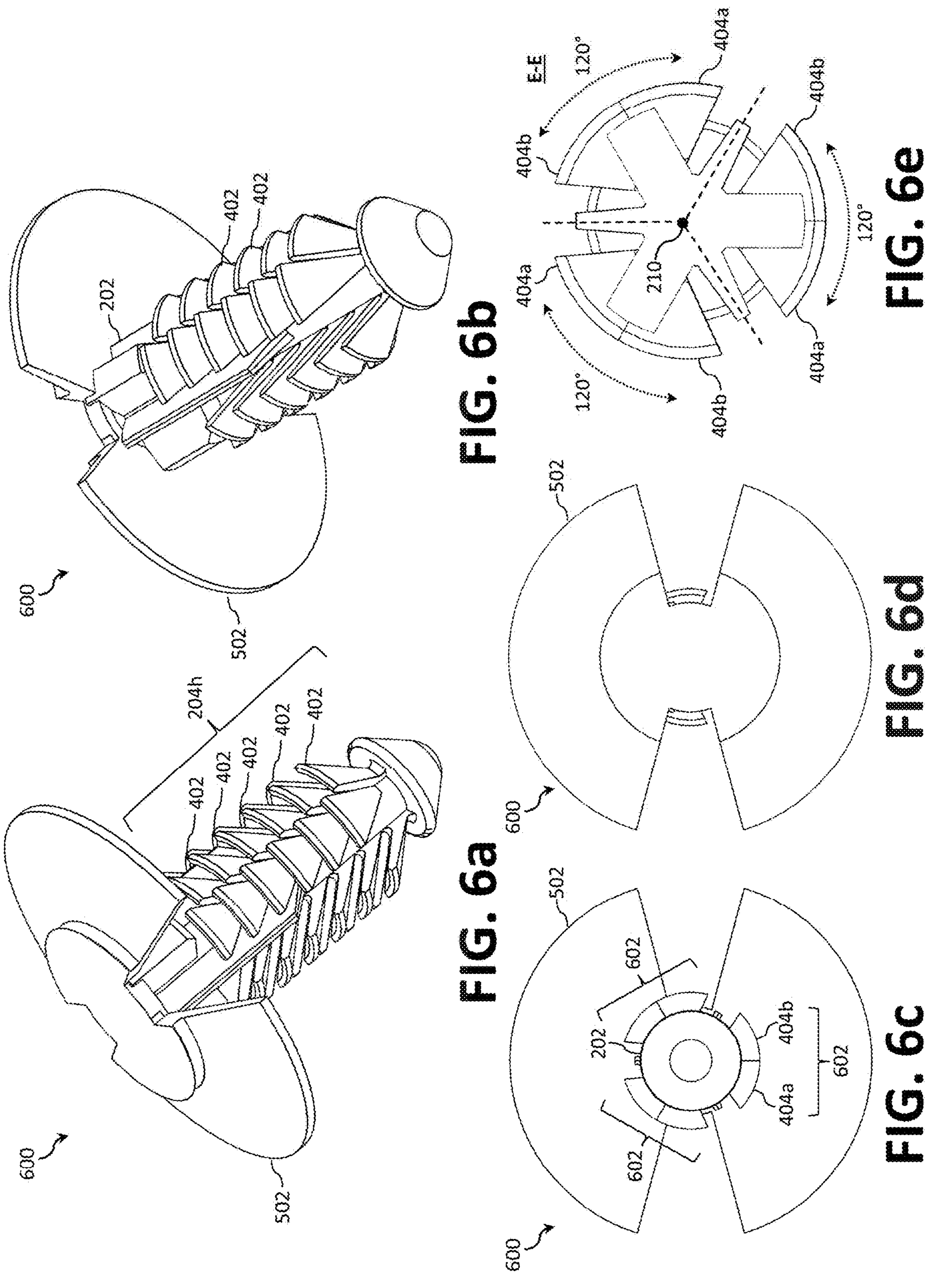

FIG. 6*a* illustrates a topside isometric view of a tri-lobe push-pin fastener in accordance with aspects of this disclosure.

FIG. 6*b* illustrates an underside isometric view of the tri-lobe push-pin fastener of FIG. 6*a*.

FIGS. 6*c* and 6*d* illustrate, respectively, bottom plan and top plan views of the tri-lobe push-pin fastener of FIG. 6*a*.

Figures 6F, 6G:
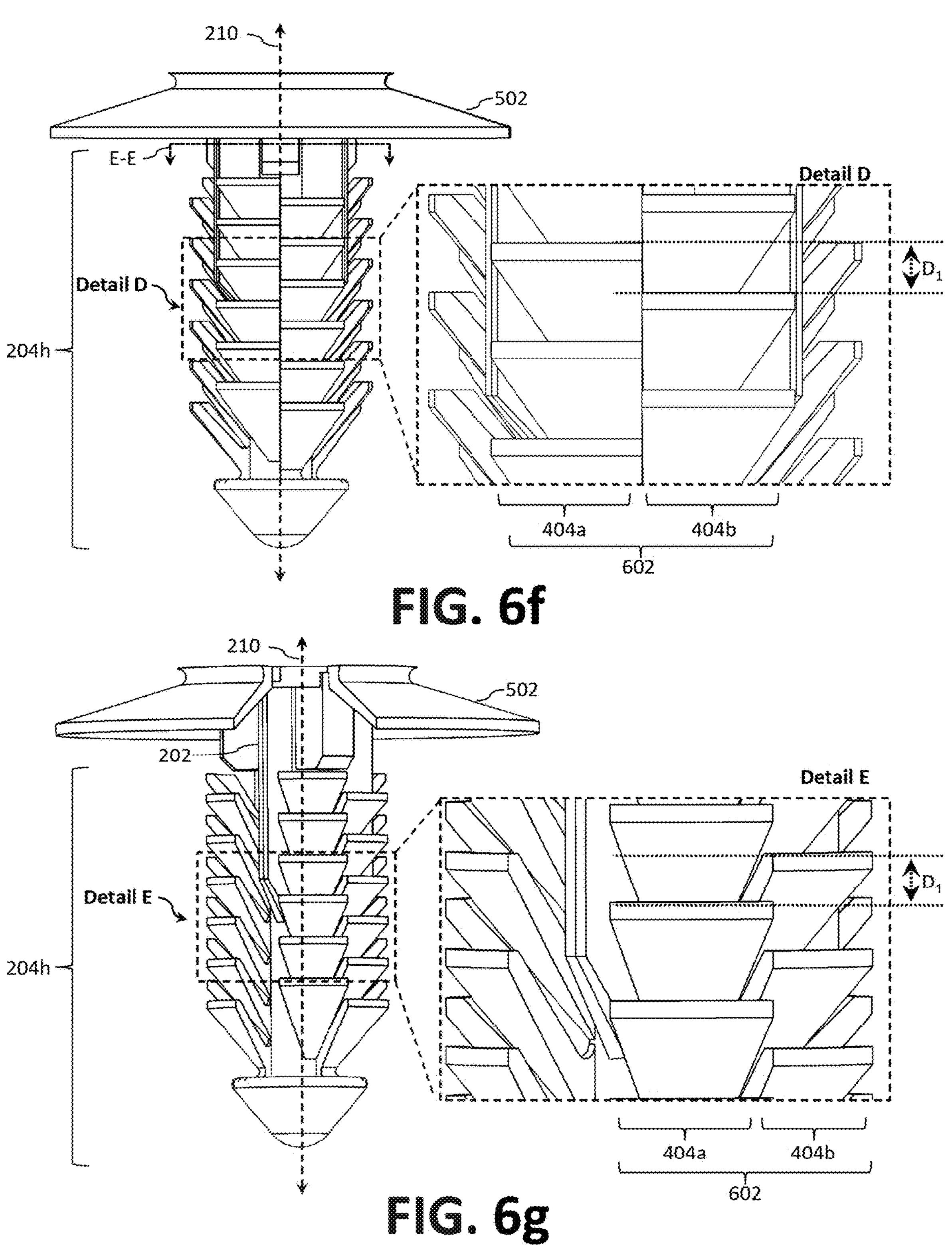

FIG. 6*e* illustrates a cross-sectional view of the tri-lobe push-pin fastener taken along cutline E-E of FIG. 6*f*.

FIGS. 6*f* and 6*g* illustrate, respectively, first and second side elevation views of the tri-lobe push-pin fastener.

Figures 7A, 7B, 7C, 7D:
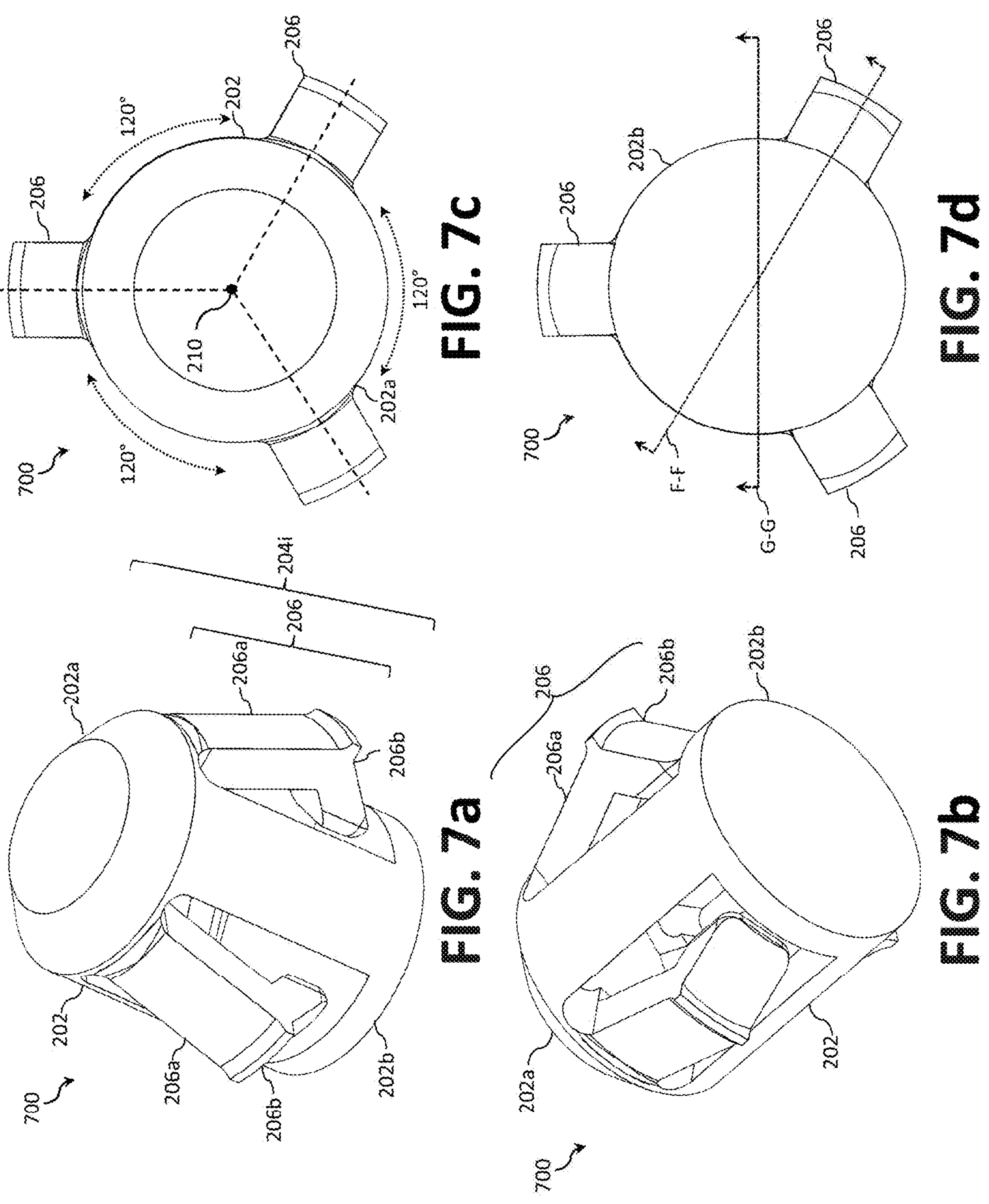

FIG. 7*a* illustrates a bottom isometric view of a 3-legged box-prong fastener in accordance with aspects of this disclosure.

FIG. 7*b* illustrates a top isometric view of the 3-legged box-prong fastener of FIG. 7*a*.

FIGS. 7*c* through 7*f* illustrate, respectively, bottom plan, top plan, first side, and second side views of the 3-legged box-prong fastener of FIG. 7*a*.

Figures 7E, 7F, 7G, 7H:
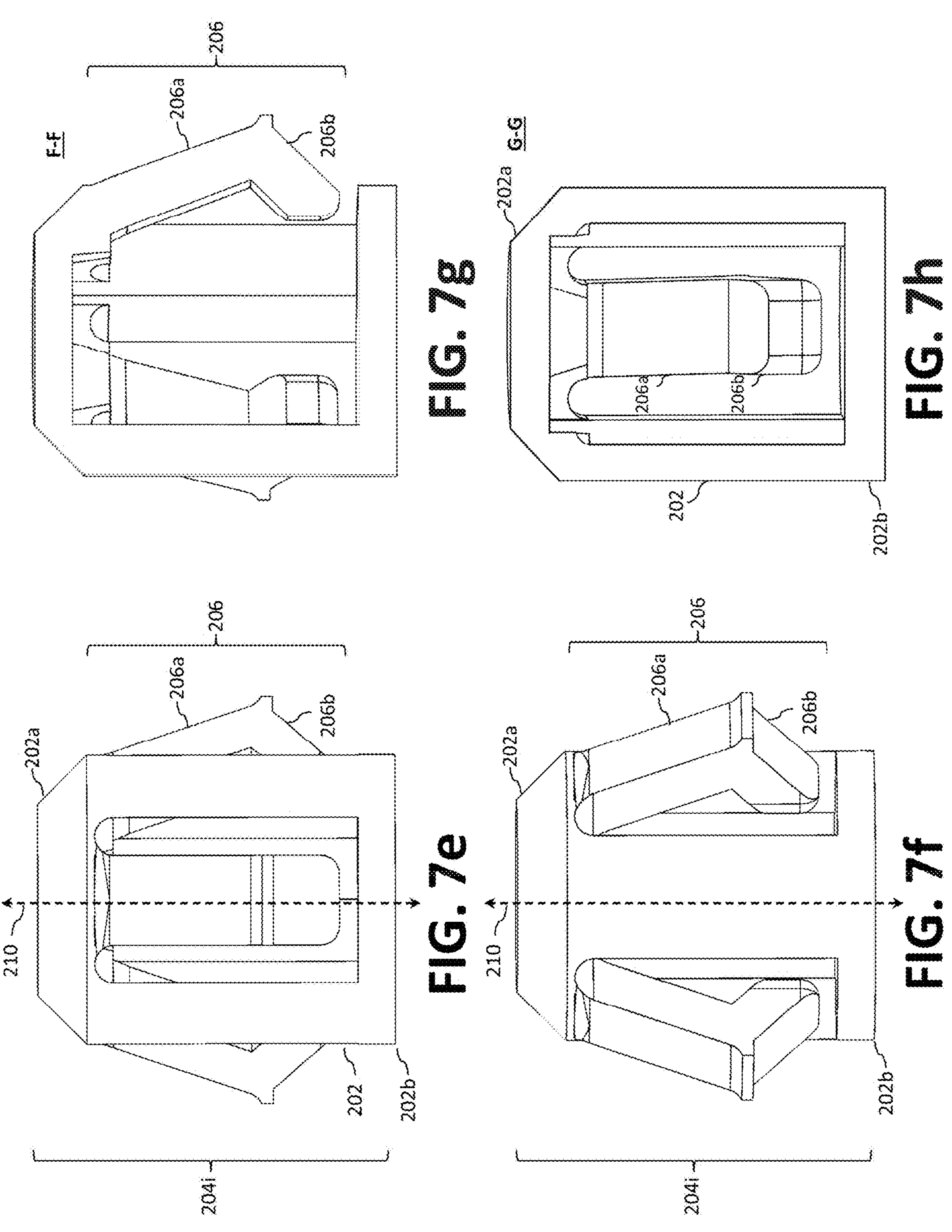

FIG. 7*g* illustrates a cross-sectional view of the 3-legged box-prong fastener taken along cutline F-F of FIG. 7*d*.

FIG. 7*h* illustrates a cross-sectional view of the 3-legged box-prong fastener taken along cutline G-G of FIG. 7*d*.

Figures 8A, 8B, 8C, 8D:
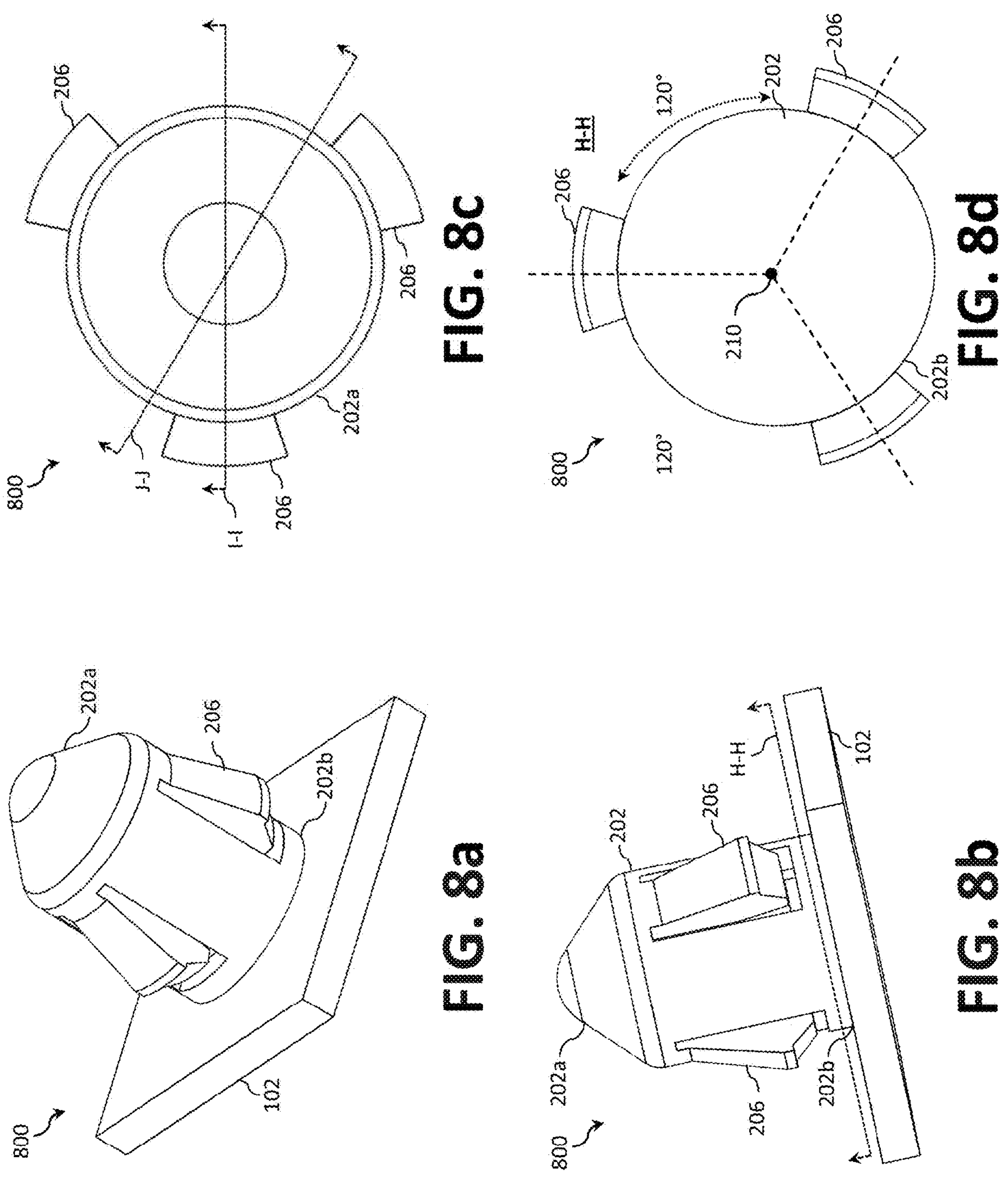

FIG. 8*a* illustrates a bottom isometric view of a 3-legged box-prong fastener in accordance with other aspects of this disclosure.

FIG. 8*b* illustrates a side isometric view of the 3-legged box-prong fastener of FIG. 8*a*.

FIGS. 8*c* through 8*f* illustrate, respectively, bottom plan, top plan, first side, and second side views of the 3-legged box-prong fastener 800, where FIG. 8*d* is a cross-sectional view taken along cutline H-H of FIG. 8*b*.

Figures 8E, 8F, 8G, 8H:
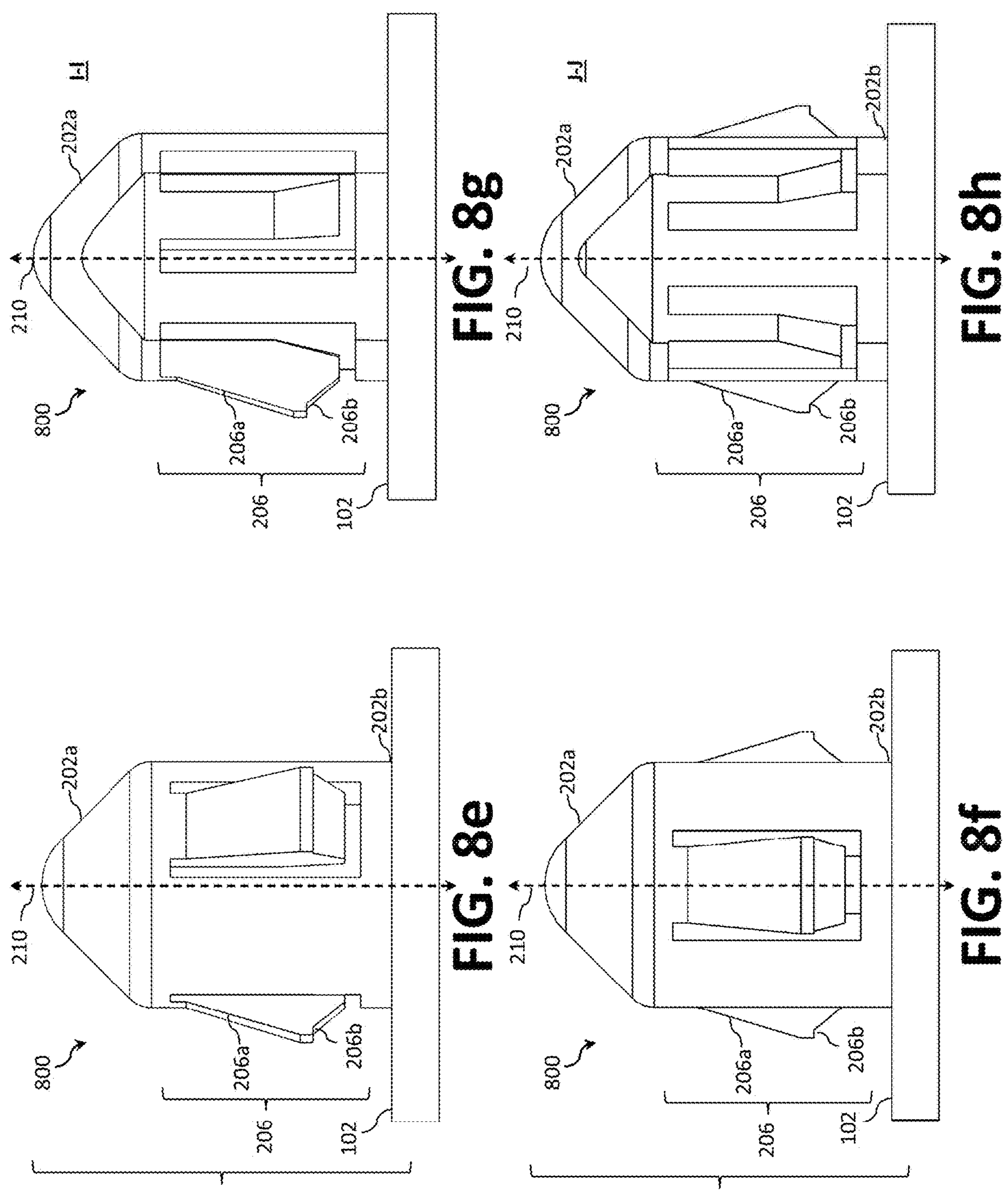

FIG. 8*g* illustrates a cross-sectional view of the 3-legged box-prong fastener 800 taken along cutline I-I of FIG. 8*c*.

FIG. 8*h* illustrates a cross-sectional view of the 3-legged box-prong fastener 800 taken along cutline J-J of FIG. 8*c*.

DETAILED DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

A fastener can be used to form a blind connection between a first component and a second component, such as automotive panels. In some examples, the fastener can be integrated with one of the first component or the second component. Integrated fasteners, as disclosed herein, offer lower cost automotive components with integrated fasteners, by reducing part numbers, complexity of inventory management, and eliminating the need to handle and assemble fasteners. Such fasteners also provide improved assembly characteristics.

In one example, a fastening system for forming a connection with a second component having an opening comprises a first component having a first surface and a second surface and an integrated fastener extending from the second surface and configured to attach the first component adjacent to the second component. The first component and the integrated fastener are formed as a unitary structure. The integrated fastener comprises a clip assembly with one or more retention features extending outwardly from the integrated fastener at an end opposite the first component. In some examples, the first component and the integrated fastener are fabricated using an additive manufacturing technique. The first component and the integrated fastener can be fabricated at different resolutions. In some examples, the clip assembly is a W-type fastener, a push pin fastener, or a pin fastener. In some examples, the clip assembly is coupled to the first component via a shank. In some examples, the fastening system further comprises a seal configured to surround the shank between the first component and the second component. In some examples, each of the one or more retention features is configured to engage the second component via a catch. In some examples, each of the one or more retention features includes a return arm resiliently connected to the clip assembly and configured to deflect as the clip assembly is passed through the opening.

In another example, a fastener for attaching a first component to a second component comprises: a body defining a central longitudinal axis; and a clip assembly having three or more retention features resiliently coupled to the body and configured to retain the fastener relative to the second component via an opening in the second component. Each of the three or more retention features are angled away from the central longitudinal axis and are configured to deflect inward toward the central longitudinal axis as the clip assembly is passed through the opening in the second component.

In some examples, the three or more retention features are spaced about the central longitudinal axis from one another by 120 degrees. In some examples, the three or more retention features are coupled to the body at a distal end thereof. In some examples, the body and the clip assembly are fabricated as a unitary structure via an additive manufacturing technique. In some examples, each of the one or more retention features includes a return arm resiliently connected to the clip assembly and configured to deflect as the clip assembly is passed through an opening in the second component. In some examples, each of the retention features comprises a concave recess formed in or on an interior surface of the return arm. In some examples, each of the one or more retention features is configured to engage the second component at the opening via a catch. In some examples, the body is a hollow cylinder and the one or more retention features extend from a sidewall thereof. In some examples, each of the one or more retention features comprises a plurality of fins distributed along the central longitudinal axis to define a fin tier. In some examples, each of the one or more retention features comprises a plurality of fins distributed along the central longitudinal axis to define a first fin tier and a second fin tier, wherein the first fin tier is offset relative to the second fin tier by a distance).

FIGS. 1*a* and 1*b* illustrate side views of example fastening system 100 configured to form a blind connection between a first component 102 and a second component 104. The first component 102 and the second component 104 may be, for example, automotive panels or other components thereof. Depending on the application, one or both of the first component 102 and/or the second component 104 may be fabricated from, for example, metal (or a metal alloy), synthetic or semi-synthetic polymers (e.g., plastics, such as acrylonitrile butadiene styrene (ABS) and polyvinyl chloride (PVC), etc.), composite materials (e.g., fiber glass), or a combination thereof. In one example, the first component 102 is an automotive secondary component and the second component 104 is an automotive primary component. In the automotive industry, example first components 102 include, without limitation, door trim panels, moldings, trim pieces, and other substrates (whether used as interior or exterior surfaces).

The first component 102 may define an A-side surface 102*a* (e.g., a first surface) and a B-side surface 102*b* (e.g., a second surface, illustrated as an undersurface). The A-side surface 102*a*, also called a class A surface, is typically the surface that is visible after assembly and, for that reason, is more aesthetically pleasing (e.g., textured, coated, or otherwise decorated) and typically free of attachment devices and/or related features. Conversely, the B-side surface 102*b*, also called a class B surface, is typically the surface that is not visible after assembly and typically includes various attachment devices and/or related features.

The first component 102 may include, define, or otherwise provide a fastener 108, which can be integrated with the first component 102 to form or otherwise fine an integrated assembly (e.g., a vehicular assembly). Depending on the material type, the fastener 108 may be formed on the B-side surface 102*b* during manufacturing of the first component 102, whether via printing (e.g., an addition manufacturing process), molding, or layup. After the first component 102 and the second component 104 are assembled, the second component 104 is covered at least partially by the first component 102. The second component 104 may be, for example, a structural component of a vehicle, such as doors, pillars (e.g., an A-pillar, B-pillar, C-pillar, etc.), dashboard components (e.g., a cross member, bracket, frame, etc.), seat frames, center consoles, fenders, sheet metal framework, or the like. The second component 104 may likewise define an A-side surface 104*a* (e.g., a first surface, such as an exterior surface) and a B-side surface 104*b* (e.g., a second surface, such as an interior surface).

As will become apparent, the second component 104 forms an opening 106, which may be likewise formed during manufacturing of the second component 104. To form the blind connection between the first component 102 and the second component 104, the fastener 108 is inserted into an opening 106 formed in or on a surface of the second component 104 as indicated by the arrow 110. By integrating the fastener 108 with the first component 102, the fastening system 100 eliminates setup variation, reduced the number of parts (and part numbers), while allowing for a relatively close assembled distance (D) between the first and second components 102, 104 (i.e., that between the A-side surface 102*a* and the B-side surface 104*b*) because there is no need for a clip-attachment structure for the fastener (e.g., a dog house, blade, etc.). Therefore, the described integrated clip-based fastening system 100 provides a blind attachment solution that positions the second component 104 closely to the first component 102 since the fastener 108 can pass through the opening 106 in the second component 104 from the A-side surface 104*a* to the B-side surface 104*b*. As can be appreciated, the length of the fastener 108 determines the protrusion distance (P) on the B-side surface 104*b* and may be adjusted accordingly depending on the needs of the application.

In some examples, the first component 102 may comprise a seal 112 positioned between the first and second components 102, 104. For example, a seal 112 may be used where it is desirable to mitigate dust, dirt, and/or moisture penetration through the opening 106. The seal may be embodied as a ring (e.g., an annulus) and fabricated from foam material, thermoplastic, rubber, etc. For example, as illustrated, a seal 112 can be configured to fit over the distal end of the fastener 108 to surround a portion of the fastener 108 (e.g., the shank or other body portion) between the first component 102 and the second component 104. In some examples, the first component 102 and/or the fastener 108 may include additional features, such as ribs and wings to mitigate noise and/or rattle between the first and second components 102, 104.

The first component 102 and the fastener 108 may be formed as a unitary structure. For example, the first component 102 and the fastener 108 may be a printed thermoplastic material component that can be printed with great accuracy and with numerous details, which is particularly advantageous, for example, in creating components requiring complex and/or precise features. In addition, additive manufacturing techniques obviate the need for mold tooling typically associated with plastic injection molding, thereby lowering up-front manufacturing costs, which is particularly advantageous in low-volume productions. In some examples, the fastener 108 may be fabricated with the first component 102 using material extrusion (e.g., fused deposition modeling (FDM)), stereolithography (SLA), selective laser sintering (SLS), material jetting, binder jetting, powder bed fusion, directed energy deposition, VAT photopolymerisation, and/or any other suitable type of additive manufacturing/3D printing process.

Additive manufacturing techniques print objects in three dimensions, therefore both the minimum feature size (i.e., resolution) of the X-Y plane (horizontal resolution) and the layer height in Z-axis (vertical resolution) are considered in overall printer resolution. Horizontal resolution is the smallest movement the printer's extruder can make within a layer on the X and the Y axis, while vertical resolution is the minimal thickness of a layer that the printer produces in one pass. Printer resolution describes layer thickness and X-Y resolution in dots per inch (DPI) or micrometers (μm). The particles (3D dots) in the horizontal resolution can be around 50 to 100 μm (510 to 250 DPI) in diameter. Typical layer thickness (vertical resolution) is around 100 μm (250 DPI), although the layers may be as thin as 16 μm (1,600 DPI). The smaller the particles, the higher the horizontal resolution (i.e., higher the details the printer produces). Similarly, the smaller the layer thickness in Z-axis, the higher the vertical resolution (i.e., the smoother the printed surface will be). A printing process in a higher vertical resolution printing, however, will take longer to produce finer layers as the printer has to produce more layers. In some examples, the first component 102 and the fastener 108 may be formed or otherwise fabricated at different resolutions during a printing operation. For example, the fastener 108 portion may be printed at a higher resolution than that of the first component 102 or vice versa as needed for a particular application.

While it is contemplated that the first component 102 and the fastener 108 would be formed during the same printing session (i.e., printed during the same printing operation), it is possible that the fastener 108 may be printed onto a preexisting first component 102. For example, the first component 102 may be printed with one or more landmark structures (e.g., a protrusion or a recess) during a first session that can be located and filled and/or surrounded with material during a second session to form the fastener 108.

FIGS. 2*a* through 2*d* illustrate an example first component 102 having a plurality of fasteners 108 integrally formed on the B-side surface 102*b* thereof. Specifically, FIG. 2*a* illustrates a bottom plan view of the example first component 102, while FIG. 2*b* illustrates a side view thereof. FIG. 2*c* illustrates a cross-sectional view taken along line A-A of FIG. 2*a*, while FIG. 2*d* illustrates a detailed view (Detail A) of FIG. 2*a*. While a blind connection will be described primarily, it is to be understood, however, that the present fastening system and associated techniques may be adapted for use with structures other than the illustrated first and second components 102, 104 that do not require the blind connection described. Accordingly, the present fastening system is not to be limited to only blind connections.

The quantity (and arrangement) of fasteners 108 may be adjusted depending on the size of the components and attachment strength required between the components for the particular application. Therefore, while four fasteners 108 (and four openings 106) are illustrated in the examples, it should be appreciated that a given first component 102 may include any number of fasteners 108 and the second component 104 may include a corresponding number of openings 106 (i.e., depending on the number of attachment points to be provided between the first and second components 102, 104).

As best illustrated in FIG. 2*d*, the fastener 108 generally comprises a body 202 and a clip assembly 204 that defines (or otherwise includes) one or more retention features 206. While the body 202 is illustrated as a shank, other body portions are contemplated, such as a barrel (e.g., a hollow cylinder, as will be described in connection with the box-prong fastener). As illustrated, the fastener 108 (e.g., via the body 202) generally defines a central longitudinal axis 210 that is generally perpendicular to a plane defined by the first component 102 (and typically the second component 104 as well post assembly). The clip assembly 204 is configured to enter and engage (or otherwise retain) the second component 104 via, for example, the opening 106. The body 202, which couples the clip assembly 204 to the first component 102, is typically narrower than the clip assembly 204.

As can be appreciated, a portion of the body 202 may also pass through the opening 106. The clip assembly 204 may be secured within the opening 106 via one or more retention features 206 (illustrated as a set of wings/clips arranged as a "W-type" fastener). The one or more retention features 206 may be outwardly biased and resiliently connected to the clip assembly 204 and/or the body 202 via a connecting portion 208 of the clip assembly 204. In this example, two retention features 206 are arranged about the central longitudinal axis 210 and spaced from one another by 180 degrees (as best illustrated in FIG. 2*a*). In some examples, the connecting portion 208 may be omitted, in which case the retention features 206 may be coupled directly to the body 202.

As illustrated, each of the one or more retention features 206 includes a return arm 206*a* resiliently connected to the clip assembly 204 and configured to deflect as the clip assembly 204 is passed through an opening 106 formed in the second component 104. A catch 206*b* (e.g., a ledge, lip, etc.) may be formed or located at an end of the return arm 206*a* to engage the second component 104 (e.g., at the perimeter of the opening 106). The retention features 206 are relatively rigid towards outward forces and as such will lock the clip assembly 204 (and/or body 202) into place within the second component 104 once it has passed through the opening 106. Additionally, the fastener 108 may be configured to engage one or more features of the second component 104.

The fastener 108 may be fabricated in various sizes depending on the application. The illustrated fastener 108 can be described as a "W-type" fastener because it generally resembles a "W" when viewed from a side, as best illustrated in FIG. 2*d*. A W-type fastener provides lead-in features for finding the opening 106. While the fastener 108 is generally described and illustrated as a W-type fastener, as will be discussed, the fastener 108 may adopt various other types of fasteners for use and integration with the first component 102. Further, in the illustrated example, the retention features 206 are coupled to the body 202 at a distal end thereof; however, they may be provided at different positions along the body 202 (as will be described in connection with the push pin and box-prong fasteners).

FIGS. 3*a* through 3*e* illustrate an example second component 104 having a plurality of openings 106 formed therein or there through. Specifically, FIG. 3*a* illustrates a top plan view of the example second component 104, while FIG. 3*b* illustrates a side view thereof. FIG. 3*c* illustrates a cross-sectional view taken along line B-B of FIG. 3*a*, while FIGS. 3*d* and 3*e* illustrate, respectively Detail B and Detail C.

In some examples, the opening 106 may pass entirely through the second component 104 (i.e., from the A-side surface 104*a* to the B-side surface 104*b*). In other examples, the opening 106 may pass only partially through the second component 104 where a cavity (i.e., through the A-side surface 104*a*, but not through to the B-side surface 104*b*), for example, is formed between the A-side surface 104*a* to the B-side surface 104*b* to house and engage the clip assembly 204 (and/or body 202).

Akin to the fastener 108, the opening 106 may be fabricated with the second component 104 using fused deposition modeling (FDM), stereolithography (SLA), selective laser sintering (SLS), and/or any other suitable type of additive manufacturing/3D printing process. Using such additive manufacturing techniques, the opening 106 may be fabricated with various engagement features (e.g., the lobes 302) that could not be readily accomplished using traditional techniques (e.g., punching, drilling, etc.).

The opening 106 can be generally circular and define a size and shape that is complementary to that of the fastener 108 such that the fastener 108 can be inserted and retained therein. For example, the opening 106 may be configured as a grommet fastener that is configured to engage, for example, a post, a clip, or other protrusion. To that end, in the illustrated example, the opening 106 is configured as a grommet fastener having a plurality of lobes 302 (e.g., three lobes 302). The lobes 302 may be configured to engage the fastener 108 or another structure, for example, a post or other protrusion. However, openings 106 of other shapes are contemplated. For example, the clip described in commonly-owned U.S. Pat. No. 8,402,605 to Christian Courtin, which relates to fastener for fixing a mat to a carpet, may be formed in or on the second component 104. Therefore, the opening 106 may be rectangular, rounded rectangular (e.g., a stadium), oval, or any other suitable shape, including a featureless circular hole.

In some examples, the opening 106 may be sized to provide a desired amount of movement (e.g., longitudinal and/or lateral movement). In some examples, the first component 102 may be configured to accommodate 2-way assembly tolerance or float (e.g., for thermal growth) across the opening 106. The tolerance may be, for example, about ±1 mm to ±5 mm, or about ±3 mm. The amount of tolerance is dictated by the type of fastener 108 used.

Those of skill in the art would appreciate that the described features and principles may be used with various types of fasteners 108. Therefore, while the retention features 206 has been described primarily as using a return arm 206*a* and a catch 206*b*, other forms of retention features 206 are contemplated, example of which are illustrated in FIGS. 4*a* through 4*f*.

Figures 4A, 4B, 4C, 4D, 4E, 4F:
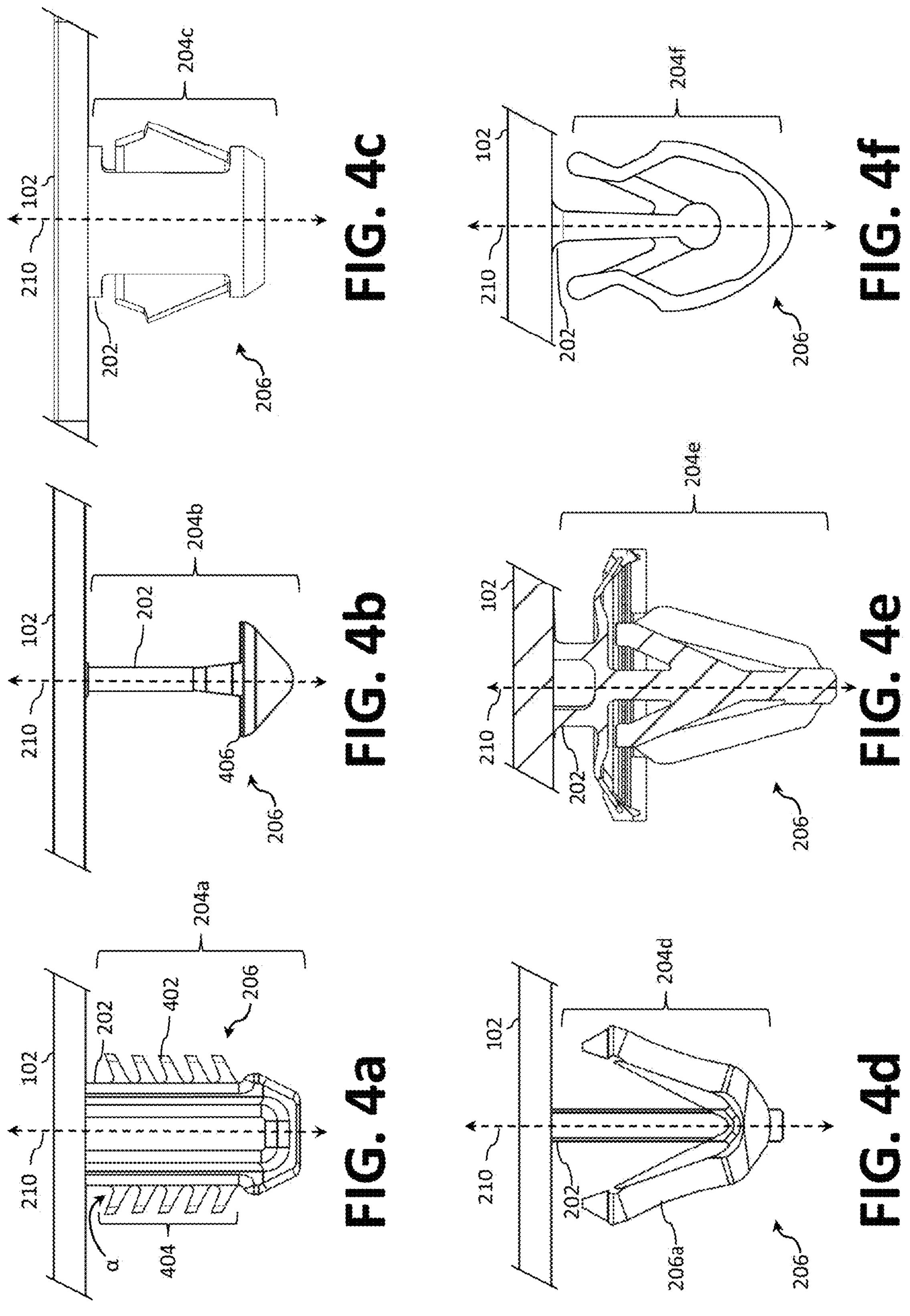

FIG. 4*a* illustrates a push-pin integrated clip assembly 204*a*. The push-pin integrated clip assembly 204*a* (sometimes called trees, pine trees, Christmas trees, etc.) includes retention features 206 composed of a plurality of fins 402 arranged along a length of the body 202. The fins 402 may be shaped as blades, teeth, barbs, or the like. As illustrated, the fins 402 are angled away from the central longitudinal axis 210 and are configured to deflect inward toward the central longitudinal axis 210 as the clip assembly 204 is passed through the opening 106 in the second component 104. The fins 402 are angled upwardly relative to the central longitudinal axis 210 (forming an acute angle (α) between each fin and the central longitudinal axis 210) to resist pullout force. In the illustrated example, the plurality of fins 402 are distributed along the central longitudinal axis 210 to define a fin tier 404 (e.g., a series of aligned fins 402), where a fin tier 404 is positioned on each side of the body 202 (e.g., arranged about the central longitudinal axis 210 and spaced from one another by 180 degrees). Another example push-pin clip assembly embodied as tri-lobe push-pin fastener 600 is described in connection with FIGS. 6*a* through 6*g*.

FIG. 4*b* illustrates an integrated pin clip 204*b*. The integrated pin clip 204*b* can be provided to serve as a reusable fastener having a low insertion value that may be used with a grommet. The integrated pin clip 204*b* includes a retention feature 206 having a pin head 406 positioned at a distal end of the body 202. The integrated pin clip 204*b* may be configured, for example, as a single position fastener or a multi-position fastener.

FIGS. 4*c* through 4*f* illustrate additional forms of retention features 206 suitable for coupling a first component 102 with a second component, including a box-prong integrated fastener 204*c* (illustrated as a 2-legged box-prong fastener), a specialty integrated clip assembly 204*d* (e.g., a Center-Lok™ fastener, which is available from Deltar®), an integrated clip assembly with four retaining legs 204*e*, and an integrated clip assembly with two snap-engaging seats 204*f*. Example box-prong fasteners 700, 800 embodied as 3-legged box-prong fasteners are described in connection with FIGS. 7*a* through 7*h* and FIGS. 8*a* through 8*h*. The integrated clip assembly with four retaining legs 204*c*, which is illustrated in FIG. 4*e* as a cross-sectional view, is further described in connection with commonly owned U.S. Pat. No. 10,385,901 to Jeffrey J. Steltz. The integrated clip assembly with two snap-engaging seats 204*f* of FIG. 4*f* is further described in connection with commonly owned U.S. Pat. No. 10,018,214 to Fulvio Pacifico Yon.

In addition to fabricating components with integrated fasteners, additive manufacturing techniques can be used to fabricate novel fasteners with greater accuracy and with features of increased complexity. Additional fasteners that can be fabricated via one or more additive manufacturing techniques will now be described, which may be integrated with a first or second component 102, 104 or manufactured as stand-alone fasteners.

FIGS. 5*a* through 5*h* illustrate an example 3-legged clip fastener 500. FIG. 5*a* illustrates a bottom isometric view of the 3-legged clip fastener 500, while FIG. 5*b* illustrates a top isometric view thereof. FIGS. 5*c* through 5*f* illustrate, respectively, bottom plan, top plan, first side, and second side views of the 3-legged clip fastener 500. FIG. 5*g* illustrates a cross-sectional view of the 3-legged clip fastener 500 taken along cutline C-C (FIG. 5*d*), while FIG. 5*h* illustrates a cross-sectional view of the 3-legged clip fastener 500 taken along cutline D-D (FIG. 5*f*).

As illustrated, in some examples, the 3-legged clip fastener 500 generally comprises a base 502, a body 202, and a 3-legged clip assembly 204*g* that defines (or otherwise includes) three retention features 206 arranged as a 3-legged "W-type" fastener. The illustrated 3-legged clip fastener 500 (e.g., via the body 202) generally defines a central longitudinal axis 210 that is generally perpendicular to a plane defined by the base 502. The 3-legged clip assembly 204*g* is configured to enter and engage (or otherwise retain) the second component 104 via, for example, the opening 106. The body 202, which couples the 3-legged clip assembly 204*g* to the base 502, is typically narrower than the 3-legged clip assembly 204*g*.

While the 3-legged clip fastener 500 is illustrated as a separate fastener that can be attached to a component via a base 502, the body 202 and 3-legged clip assembly 204*g* can instead be integrated with the first component 102 as described in connection with FIGS. 2*a* through 2*d*. In essence, the first component 102 can take the place of the illustrated base 502. The 3-legged clip assembly 204*g* is similar in operation to the clip assembly 204 described in connection with FIGS. 2*a* through 2*d*, but includes three retention features 206 arranged about the central longitudinal axis 210 and spaced from one another by 120 degrees (as best illustrated in FIG. 5*h*). Providing three retention features 206 results in a stable engagement with the second component 104 by providing 3 points of contact, thus mitigating side-to-side movement (e.g., lateral movement). While three retention features 206 are illustrated, one of skill in the art would appreciate that additional retention features 206 may be used. For example, four retention features 206 may be arranged about the central longitudinal axis 210 and spaced from one another by 90 degrees, five retention features 206 may be arranged about the central longitudinal axis 210 and spaced from one another by 72 degrees, and so forth.

The one or more retention features 206 may be outwardly biased and resiliently connected to the 3-legged clip assembly 204*g* and/or the body 202 via a connecting portion (where desired) of the 3-legged clip assembly 204*g*. As illustrated, each of the one or more retention features 206 includes a return arm 206*a* resiliently connected to the 3-legged clip assembly 204*g* and configured to deflect as the 3-legged clip assembly 204*g* is passed through an opening 106 formed in the second component 104. The one or more retention features 206 are illustrated as being connected to a distal end of the body 202. As illustrated, each return arm 206*a* comprises an exterior surface 506*a* generally facing away from the body 202 and an interior surface 506*b* generally facing toward the body 202. A catch 206*b* (e.g., a ledge, lip, etc.) may be formed or located at an end of the return arm 206*a* to engage the second component 104 (e.g., at the perimeter of the opening 106).

The retention features 206 are relatively rigid towards outward forces and as such will lock the 3-legged clip assembly 204*g* (and/or body 202) into place within the second component 104 once it has passed through the opening 106. Additionally, the 3-legged clip fastener 500 may be configured to engage one or more features of the second component 104. In some examples, the retention features 206 may further comprise one or more concave recesses 504 formed in or on the interior surface 506*b* of the return arm 206*a*. The one or more concave recesses 504 serve to provide increased flexibility during insertion by reducing necessary insertion force, while maintaining a high pull-out force. In addition, the one or more concave recesses 504 can be shaped to accommodate and receive the body 202 (or portion thereof) during insertion, thus allowing the 3-legged clip assembly 204*g* to fit smaller openings 106. Finally, the one or more concave recesses 504 reduce the amount of material needed to fabricate the 3-legged clip assembly 204*g* and/or 3-legged clip fastener 500, thus reducing material cost.

FIGS. 6*a* through 6*g* illustrate an example tri-lobe push-pin fastener 600 where the retention features 206 are provided via a plurality of fins 402. FIG. 6*a* illustrates a topside isometric view of the tri-lobe push-pin fastener 600, while FIG. 6*b* illustrates an underside isometric view thereof. FIGS. 6*c* and 6*d* illustrate, respectively, bottom plan and top plan views of the tri-lobe push-pin fastener 600, while FIG.

6*e* illustrates a cross-sectional view of the tri-lobe push-pin fastener 600 taken along cutline E-E (FIG. 6*f*). FIGS. 6*f* and 6*g* illustrate, respectively, first and second side elevation views of the tri-lobe push-pin fastener 600.

As illustrated, in some examples, the tri-lobe push-pin fastener 600 generally comprises a base 502, a body 202, and a plurality of fins 402 arranged along the body 202 as sets of fins 602 to define the tri-lobe push-pin assembly 204*h*. The fins 402 are relatively rigid towards outward forces and as such will lock the tri-lobe push-pin assembly 204*h* (and/or body 202) into place within the second component 104 once it has passed through the opening 106. The tri-lobe push-pin fastener 600 is similar in operation to the push-pin integrated clip assembly 204*a* described in connection with FIG. 4*a*, but employs different fin arrangements and uses three retention features 206 arranged about the central longitudinal axis 210 and spaced from one another by 120 degrees (as best illustrated in FIG. 6*e*). Providing three retention features 206 results in a stable engagement with the second component 104 by providing 3 points of contact, thus mitigating side-to-side movement.

The illustrated tri-lobe push-pin fastener 600 (e.g., via the body 202) generally defines a central longitudinal axis 210 that is generally perpendicular to a plane defined by the base 502. The tri-lobe push-pin assembly 204*h* is configured to enter and engage (or otherwise retain) the second component 104 via, for example, the opening 106. In the illustrated example, the tri-lobe push-pin assembly 204*h* includes three retention features 206, each having a set of fins 602, positioned about the central longitudinal axis 210 and spaced from one another by 120 degrees (as best illustrated in FIG. 6*e*). Providing three sets of fins 602 results in a stable engagement with the second component 104 by providing 3 points of contact, thus mitigating side-to-side movement. Each set of fins 602 comprises a first plurality of fins 402 arranged into a first fin tier 404*a* and a second plurality of fins 402 arranged into a second fin tier 404*b*. As best illustrated in Detail D (FIG. 6*c*) and Detail E (FIG. 6*d*), the first fin tier 404*a* is offset along the length of the body 202 relative to the second fin tier 404*b* by distance D1. Offsetting the first fin tier 404*a* relative to the second fin tier 404*b* by distance D1 allows for finer iterations of component thicknesses.

While the tri-lobe push-pin fastener 600 is illustrated as a separate fastener that can be attached to a component via the base 502, the body 202 and tri-lobe push-pin assembly 204*h* can instead be integrated with the first component 102 as described in connection with FIGS. 2*a* through 2*d*. In essence, the first component 102 can take the place of the illustrated base 502.

FIGS. 7*a* through 7*h* illustrate an example 3-legged box-prong fastener 700. FIG. 7*a* illustrates a bottom isometric view of the 3-legged box-prong fastener 700, while FIG. 7*b* illustrates a top isometric view thereof. FIGS. 7*c* through 7*f* illustrate, respectively, bottom plan, top plan, first side, and second side views of the 3-legged box-prong fastener 700. FIG. 7*g* illustrates a cross-sectional view of the 3-legged box-prong fastener 700 taken along cutline F-F (FIG. 7*d*), while FIG. 7*h* illustrates a cross-sectional view of the 3-legged box-prong fastener 700 taken along cutline G-G (FIG. 7*d*).

As illustrated, in some examples, the 3-legged box-prong fastener 700 generally comprises a body 202 that defines (or otherwise includes) three retention features 206 arranged to form a 3-legged box-prong assembly 204*i*. In this example, the body 202 is illustrated as a hollow barrel generally defining a cylindrical sidewall and a closed leading end 202*a*. The illustrated 3-legged box-prong fastener 700 (e.g., via the body 202) generally defines a central longitudinal axis 210 that is generally perpendicular to a plane defined by the base end 202*b* of the body 202. The 3-legged box-prong assembly 204*i* is configured to enter and engage (or otherwise retain) the second component 104 via, for example, the opening 106.

The illustrated body 202 includes the leading end 202*a* (e.g., a tip) and a base end 202*b*. As illustrated, the leading end 202*a* may be closed. The leading end 202*a* may be rounded, tapered, or otherwise shaped to increase case of insertion through the opening 106. For example, as best illustrated in FIGS. 7*a*, 7*e*, and 7*f*, the leading end 202*a* of the body 202 can be chamfered along the perimeter to help align and guide the leading end 202*a* during insertion through the opening 106. Other shapes are contemplated, however, such as rounded cone tips, round nose tips, cylindro-spherical tips, conical, etc. For example, a leading end 202*a* with a rounded cone tip is illustrated and described in connection with FIGS. 8*a* through 8*h*.

The 3-legged box-prong assembly 204*i* is similar in operation to the box-prong integrated fastener 204*c* described in connection with FIG. 4*c*, but includes three retention features 206 extending from the sidewall of the body 202 that are arranged about the central longitudinal axis 210 and spaced from one another by 120 degrees (as best illustrated in FIG. 7*c*). Providing three retention features 206 results in a stable engagement with the second component 104 by providing 3 points of contact, thus mitigating side-to-side movement. The 3-legged box-prong fastener 700 can be provided as a separate fastener that can be attached to a component via a cap at the base end 202*b*, or instead be integrated with the first component 102 as described in connection with FIGS. 2*a* through 2*d* (as well as FIGS. 8*a* through 8*h*).

The one or more retention features 206 may be outwardly biased and resiliently connected to the body 202. As illustrated, each of the one or more retention features 206 includes a return arm 206*a* resiliently connected to the body 202 and configured to deflect as the 3-legged box-prong assembly 204*i* is passed through an opening 106 formed in the second component 104. A catch 206*b* (e.g., a ledge, lip, etc.) may be formed or located at an end of the return arm 206*a* to engage the second component 104 (e.g., at the perimeter of the opening 106). The retention features 206 are relatively rigid towards outward forces and as such will lock the 3-legged box-prong assembly 204*i* (and/or body 202) into place within the second component 104 once it has passed through the opening 106.

FIGS. 8*a* through 8*h* illustrate another example 3-legged box-prong fastener 800. FIG. 8*a* illustrates a bottom isometric view of the 3-legged box-prong fastener 800, while FIG. 8*b* illustrates a side isometric view thereof. FIGS. 8*c* through 8*f* illustrate, respectively, bottom plan, cross-sectional top plan taken along cutline H-H (FIG. 8*b*), first side, and second side views of the 3-legged box-prong fastener 800. FIG. 8*g* illustrates a cross-sectional view of the 3-legged box-prong fastener 800 taken along cutline I-I (FIG. 8*c*), while FIG. 8*h* illustrates a cross-sectional view of the 3-legged box-prong fastener 800 taken along cutline J-J (FIG. 8*c*).

As illustrated, in some examples, the 3-legged box-prong fastener 800 generally comprises a body 202 that defines (or otherwise includes) three retention features 206 arranged to form a 3-legged box-prong assembly 204*j*. The example 3-legged box-prong fastener 800 of FIGS. 8*a* through 8*h* is substantially the same as the 3-legged box-prong fastener

700 of FIGS. 7*a* through 7*h*, except that the leading end 202*a* is illustrated as a rounded cone tip and the profile of the three retention features 206 has been modified to provide an increase insertion force by concentrating the bending moment at the connection point.

Each of the aforementioned fasteners can be fabricated via one or more additive manufacturing techniques and/or integrated with the first component 102 and/or the second component 104 using the above-described techniques. Those of skill in the art, however, would appreciate that the various aforementioned fastener designs could be provided as separate fastener components where it is not desirable or necessary to integrate the fastener with the first component 102 and/or the second component 104. Therefore, the aforementioned fastener designs may be integrated with or separate from the first component 102 and/or the second component 104. Additional suitable types of clip assemblies 204 that can be used include those described in commonly owned U.S. Pat. No. 6,305,055 to Dominique Castro, U.S. Pat. No. 6,974,292 to Wayne M. Hansen, U.S. Pat. No. 8,402,605 to Christian Courtin, U.S. Pat. No. 8,613,128 to Benjamin H. Moerke, U.S. Pat. No. 9,963,087 to Eric Leverger, U.S. Pat. No. 9,475,525 to Mark O. Lepper, and U.S. Pat. No. 9,982,694 to Derek Scroggie, as well as those described in U.S. Patent Publication No. 2020/0232495 to Mark O. Lepper.

The above-cited patents and patent publications are hereby incorporated by reference in their entirety. Where a definition or the usage of a term in a reference that is incorporated by reference herein is inconsistent or contrary to the definition or understanding of that term as provided herein, the meaning of the term provided herein governs and the definition of that term in the reference does not necessarily apply.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A vehicular assembly for forming a connection with an opening in a primary component of a vehicle, the vehicular assembly comprising:

a secondary component of the vehicle having a first surface and a second surface; and an integrated fastener extending from the second surface of the secondary component and configured to attach the secondary component adjacent to the primary component, wherein the secondary component and the integrated fastener are formed integrally as a single, unitary structure, wherein the integrated fastener comprises a clip assembly with one or more retention features extending outwardly from the integrated fastener at an end opposite the secondary component, wherein the integrated fastener comprises a plurality of integrally formed layers of material arranged in a layerwise build pattern extending away from the second surface, and wherein the one or more retention features and intervening portions of the integrated fastener are defined by the layerwise build pattern such that the retention features are formed continuously across multiple of the layers without discrete interfaces.

2. The vehicular assembly of claim 1, wherein the plurality of integrally formed layers include regions formed at different resolutions such that adjacent portions of the integrated fastener include different layer geometries.

3. The vehicular assembly of claim 2, wherein the different layer geometries define different feature sizes or surface contours within the integrated fastener.

4. The vehicular assembly of claim 1, wherein the clip assembly is a W-type fastener.

5. The vehicular assembly of claim 1, wherein the clip assembly is a push pin fastener.

6. The vehicular assembly of claim 1, wherein the clip assembly is a pin fastener.

7. The vehicular assembly of claim 1, wherein the clip assembly is coupled to the secondary component via a shank.

8. The vehicular assembly of claim 7, further comprising a seal configured to surround the shank between the secondary component and the primary component.

9. The vehicular assembly of claim 1, wherein each of the one or more retention features is configured to engage the primary component via a catch.

10. The vehicular assembly of claim 9, wherein each of the one or more retention features includes a return arm resiliently connected to the clip assembly and configured to deflect as the clip assembly is passed through the opening.

11. A vehicular assembly for forming a connection with a first component having an opening, the vehicular assembly comprising:

a second component having a first surface and a second surface; and an integrated fastener defining a central longitudinal axis extending from the second surface and configured to attach the second component adjacent to the first component, wherein the second component and the integrated fastener are formed as a unitary structure, wherein the integrated fastener comprises a clip assembly having three retention features resiliently coupled to a body and configured to retain the integrated fastener relative to the first component via an opening in the first component, wherein each of the three retention features is angled away from the central longitudinal axis and is configured to deflect inward toward the central longitudinal axis as the clip assembly is passed through the opening in the first component, and wherein the three retention features are spaced about the central longitudinal axis from one another by 120 degrees.

12. The vehicular assembly of claim 11, wherein the second component and the integrated fastener are fabricated at different resolutions using an additive manufacturing technique.

13. The vehicular assembly of claim 11, wherein the clip assembly is a W-type fastener.

14. The vehicular assembly of claim 11, wherein the clip assembly is a push pin fastener.

15. The vehicular assembly of claim 11, wherein the clip assembly is a pin fastener.

16. The vehicular assembly of claim 11, wherein the clip assembly is coupled to the second component via a shank.

17. The vehicular assembly of claim 16, further comprising a seal configured to surround the shank between the second component and the first component.

18. The vehicular assembly of claim 11, wherein each of the three retention features is configured to engage the first component via a catch.

19. The vehicular assembly of claim 18, wherein each of the three retention features includes a return arm resiliently connected to the clip assembly and configured to deflect as the clip assembly is passed through the opening.

20. A vehicular assembly for forming a connection with a structural component of a vehicle having an opening, the vehicular assembly comprising:

a trim component of the vehicle having a first surface and a second surface; and an integrated fastener-extending from the second surface and configured to attach the trim component adjacent to the structural component of the vehicle, wherein the trim component and the integrated fastener are formed integrally as a single, unitary structure, wherein the integrated fastener comprises a clip assembly with one or more retention features extending outwardly from the integrated fastener at an end opposite the trim component, wherein the integrated fastener comprises a plurality of integrally formed layers of material arranged in a layerwise build pattern extending away from the second surface, and wherein the one or more retention features and intervening portions of the integrated fastener are defined by the layerwise build pattern such that the one or more retention features are formed continuously across multiple of the layers without discrete interfaces.

* * * * *